United States Patent
Beaud et al.

(10) Patent No.: US 9,240,126 B2
(45) Date of Patent: Jan. 19, 2016

(54) METHOD OF SIMULATING A FAILURE ON AN AIRCRAFT

(71) Applicant: AIRBUS HELICOPTERS, Marignane (FR)

(72) Inventors: Southdary Beaud, Carpentras (FR); Emmanuel Camhi, Fuveau (FR)

(73) Assignee: Airbus Helicopters, Marignane (FR)

( * ) Notice: Subject to any disclaimer, the term of this patent is extended or adjusted under 35 U.S.C. 154(b) by 57 days.

(21) Appl. No.: 13/741,751

(22) Filed: Jan. 15, 2013

(65) Prior Publication Data

US 2013/0203021 A1    Aug. 8, 2013

(30) Foreign Application Priority Data

Feb. 6, 2012   (FR) ...................................... 12 00346

(51) Int. Cl.
*G09B 5/00* (2006.01)
*G09B 9/18* (2006.01)
*G09B 9/46* (2006.01)

(52) U.S. Cl.
CPC .. *G09B 5/00* (2013.01); *G09B 9/18* (2013.01); *G09B 9/46* (2013.01)

(58) Field of Classification Search
CPC .............. G09B 9/08; G09B 9/16; G09B 9/44; G09B 9/46; G09B 5/00

USPC ..................................................... 434/29–71
See application file for complete search history.

(56) References Cited

U.S. PATENT DOCUMENTS

| | | | |
|---|---|---|---|
| 3,400,471 A * | 9/1968 | Papin et al. | ..................... 434/33 |
| 4,831,567 A | 5/1989 | Lea | |
| 5,873,546 A | 2/1999 | Evans | |
| 2002/0133322 A1 | 9/2002 | Williams | |
| 2005/0234689 A1 | 10/2005 | Gates | |
| 2009/0186320 A1 | 7/2009 | Rucci | |

OTHER PUBLICATIONS

Search Report and Written Opinion; Application No. FR 1200346; dated Sep. 27, 2012.

* cited by examiner

*Primary Examiner* — Timothy A Musselman
(74) *Attorney, Agent, or Firm* — Brooks Kushman P.C.

(57) ABSTRACT

A method of failure simulation for an aircraft (7) having a power plant (10) with at least two turbine engines (11, 12), together the two engines develop an overall power, each engine (11, 12) being capable of delivering at least one contingency power in order to compensate for a total failure of other engines (11, 12). The device serves during a failure simulation to modify the overall power delivered by the power plant, with this modification being performed with the help of first adjustment means (20). Second adjustment means (30) serve to modify also the difference between the minimum power obtained during the simulated failure and the stabilized overall power, and also the time between said failure stabilizing on said overall power.

19 Claims, 2 Drawing Sheets

METHOD OF SIMULATING A FAILURE ON AN AIRCRAFT

CROSS REFERENCE TO RELATED APPLICATIONS

The present application claims priority to French patent application No. FR 12/00346 filed on Feb. 6, 2012, the disclosure of which is incorporated in its entirety by reference herein.

BACKGROUND OF THE INVENTION (1) Field of the Invention

The present invention relates to a method and a device for simulating a failure on an aircraft. The method of the invention is intended more particularly to simulate a turbine engine failure on a rotary wing aircraft having at least two engines.

(2) Description of Related Art

During this type of failure, the aircraft has only one engine left delivering power. However with only one engine it is clearly not possible to reach a power level that corresponds to the maximum power level from two engines.

The aircraft is thus in a degraded mode of operation in which the total power available is less than the power delivered by both engines. Nevertheless, in particular stages of flight, such as when hovering or landing, a rotary wing aircraft requires a large amount of power.

For this purpose, the degraded mode of operation includes several supercontingency power ratings:

a first contingency rating associates a supercontingency power referred to as 30-sec OEI (one engine inoperative) that is usable for a duration of the order of thirty consecutive seconds, this first contingency rating being usable for about three times during a flight;

a second contingency rating associates a maximum contingency power referred to as 2-min OEI and is usable for a duration of about two minutes; and a third contingency rating associating an intermediate contingency power referred to as OEIcontinuous, which power is usable for a duration extending to the end of the flight, for example.

The 30-sec OEI first contingency rating and the 2-min OEI second contingency rating can be used for limited lengths of time only. The powers of these ratings are well above the power delivered by an engine in normal operation and using either of these two ratings requires the aircraft to be overhauled as a consequence. However, exceeding those recommended utilization times can lead to even greater and possibly immediate degradation of the engine or of the power transmission means, e.g. the rotors providing lift and also propulsion.

The 30-sec OEI, 2-min OEI, and OEIcontinuous contingency ratings are controlled by an electronics control unit of the engine. Each engine is connected to such a control unit, which is commonly referred to as an electronic engine control unit (EECU). EECUs also possess connections with each other enabling them to exchange information about the operation of the engines.

The powers associated with each contingency rating are determined as a function of flight conditions, i.e. the pressure and the temperature outside the aircraft, corresponding to the pressure and the temperature of the air being fed to the engines, and also the speed and the altitude of the aircraft.

In order to train aircraft pilots in this type of failure and in the associated degraded mode of operation, rotary wing aircraft generally have a "training" mode available. This training mode makes it possible to simulate the total failure of one engine.

When training mode is activated, conventionally by means of a switch on the instrument panel of the aircraft, the control unit of each engine reduces the power from the two engines so that the overall power from both engines corresponds to the 30-sec OEI supercontingency power of the first contingency rating. The term "low overall power" is used below to designate this combined power from both engines in training mode.

In training mode, two configurations are possible for obtaining this low overall power. Firstly, the power may be shared uniformly between both engines.

The training mode may also simulate a total failure of one engine more closely, in particular by running a first engine at an idling speed in which it nevertheless delivers some minimum power level. Under such circumstances, the switch on the control panel has two positions, corresponding to simulating failure on each of the engines. The power delivered by the second engine is then raised to a value close to the intermediate contingency power OEIcontinuous of the third contingency rating, in general up to 5% below that power. This 5% margin serves to avoid degrading the engine and the associated transmission means. The remaining 5% of the power needed to reach the low overall power for the aircraft is delivered by the first engine at its idling speed.

Once training mode has been activated, the power of the aircraft is limited to this low overall power so that the pilot is trained in this degraded mode of operation. The contingency ratings 30-sec OEI, 2-min OEI, and OEIcontinuous are then simulated in this degraded mode of operation.

Nevertheless, the training mode has several drawbacks.

Firstly, the weight of the aircraft is not variable, with tables defining flight envelopes that are authorized during such training as a function of the weight. The weight of the aircraft is taken into account by the control unit in order to determine the low overall power level.

Also, training mode simulates only the total failure of one engine. It is not possible, for example, to simulate a partial loss of power from one engine or an accidental flameout of an engine.

Furthermore, since training mode simulates only and precisely the total failure of one engine, the training cannot be carried out progressively, e.g. to accommodate a trainee's level of competence and progress.

Finally, the power developed by an engine tends to decrease over time. The power developed by a new turbine engine is greater than the power developed by an older engine. As a result, the contingency powers available in a degraded mode of operation are different depending on whether the engine is new or old.

Only one configuration can be used in the training mode of an aircraft, corresponding to an aircraft weight and to contingency rating powers that are imposed by flight conditions and by the aging state of the engine.

Also known is document US 2009/0186320, which describes a system enabling a total failure of one engine to be simulated for different configurations. Those configurations are predefined as a function of flight conditions, such as the outside temperature and pressure or the altitude of the aircraft. That system also serves to adapt the power available for training as a function of the total weight of the aircraft but only for two types of loading. That system thus enables several different types of training to be simulated, but the power made available is calculated from predetermined criteria and therefore cannot be adapted, in particular to the competence of the trainee.

Furthermore, document US 2002/133322 describes a method of simulating the failure of one engine in which the power available for simulation is obtained by reducing the power of a first engine for which the failure is being simulated. The power from the second engine is then increased in order to reach the required power level. The distribution of power is thus not uniform between the two engines. In the event of a real failure of the second engine, the reaction time of the first engine, which is idling, can leave the aircraft in a dangerous situation.

Document US 2005/234689 describes a method of simulating the failure of one engine by using different acceleration relationships for the two engines of the aircraft. The combination of those accelerations corresponds to the accelerations that would be provided by a single engine in the event of the failure of the other engine. Furthermore, the power from each engine is reduced so as to have a power margin available in the event of a real failure of one engine.

Document U.S. Pat. No. 5,873,546 describes a method and a system for simulating a failure of one engine for various different configurations. A switch serves in particular to select the failure mode that is to be simulated, from among the three ratings: 30-sec OEI; 2-min OEI; and OEIcontinuous. That method also makes it possible to select the total loaded weight of the aircraft that it is desired to simulate.

Finally, document U.S. Pat. No. 4,831,567 describes a method of simulating the failure of one engine in which the total power available for simulation can be obtained by reducing either the power from a single engine on which the failure is being simulated, or the power from both engines in an equivalent manner. Power distribution is thus not necessarily uniform between the two engines, in particular concerning the power delivered by a first engine on which the failure is being simulated, with that power being reduced while the power from the other engine is increased in order to reach the total power level required for the simulation.

BRIEF SUMMARY OF THE INVENTION

An object of the present invention is thus to propose a method of simulating a failure that makes it possible to avoid the above-mentioned limitations. The invention provides a method of simulating a failure for an aircraft having a power plant. The power plant comprises at least two turbine engines together developing an overall power. Each engine is capable of delivering at least one contingency power in order to compensate for a total failure of at least one other engine.

The method is remarkable in that the low value for the overall power is set manually with the help of first adjustment means, and then the overall power from the power plant is lowered down to that low value in order to simulate the failure of at least one other engine. The low overall power value ranges between a minimum value and a maximum value.

Each engine possesses its own EECU that serves in particular to control the contingency power delivered by each engine in the event of one of the engines failing. In a training mode, these control units serve to control the power from each engine in order to simulate a total failure of one of the engines.

A first overall power value is then determined by the control units, this first value corresponding to the power available from the power plant in the event of a total failure of one of the engines. The first overall power value is a function of the aircraft flight conditions, i.e. the pressure and temperature outside the aircraft, and also the speed and the altitude of the aircraft. This value also takes account of the weight of the aircraft.

The method of the invention makes it possible to act manually with the help of first adjustment means to increase or decrease this first value to a low value for the overall power.

Thereafter, on starting the simulation, e.g. by acting on a dedicated button, the overall power from the power plant is diminished until this low overall power value is reached. For that purpose, the first adjustment means sends a first signal to the control unit of each engine, the signal corresponding to the position of the adjustment means. The power of at least one engine is then modified accordingly so that the low overall power from the power plant is equal to the selected low value. The 30-sec OEI, 2-min OEI, and OEIcontinuous contingency ratings corresponding to the simulated failure are also modified by the control unit in correspondence with the selected low overall power value.

In the context of simulating a failure, the first adjustment means is used by an instructor. By enabling the low overall power to be set, the first adjustment means advantageously makes it possible to simulate various different failure configurations. For example, by increasing the selected low overall power, it is possible for an inexperienced trainee to begin training progressively. Thereafter, the instructor may use the first adjustment means to reduce the low overall power during different training sessions.

Furthermore, by setting the low overall power, the instructor can simulate failures with different aircraft weights. For example, by reducing the low overall power, it is possible to simulate an aircraft with a greater on-board load.

By reducing the low overall power, it is also possible to simulate an aircraft having old engines that deliver less power than new engines.

Consequently, the method of the invention makes it possible to simulate numerous configurations for the total failure of one engine, such as different total aircraft weights, greater or lesser aging of the aircraft engines, or indeed a greater or lesser reduction in the power available from the power plant.

The first adjustment means makes it possible to set the low overall power value before beginning the simulation. Nevertheless, it is possible to modify the low overall power after the simulation has begun. To do that, after momentarily stopping the simulation, a change made to the position of the first adjustment means leads to a modification of the low overall power as soon as the simulation restarts. This mode of operation is advantageous, in particular when the low overall power value is inappropriate for the level of competence of the trainee and so the low overall power needs to be increased.

The method of the invention may also include one or more additional characteristics.

The low overall power delivered by the power plant may be obtained in various different ways. The way power is shared between the engines can enable the failure of one particular engine to be simulated closely. Under such circumstances, that engine is run at an idling speed in which it delivers a minimum level of power. The power from at least one other engine is then brought up to a power level that is necessary for obtaining the low overall power from the power plant.

Preferably, the method of the invention causes the low overall power to be shared uniformly between all of the engines of the power plant. In this way, the power delivered by each engine is far from its operating power limit. As a result, the risk of degrading the power plant is reduced and its lifetime is improved. Furthermore, in the event of a real failure of one of the engines in the power plant, a power margin is available on the operating engine(s).

The method of the invention also makes it possible, while simulating a failure, to set at least one characteristic for the passage of the overall power to the low overall power, with this being done with the help of second adjustment means.

Under such conditions, during the simulation of the total failure of one engine the overall power from the power plant drops down to a minimum power level before increasing and stabilizing at the low overall power. This drop of power is defined in particular by two characteristics, a difference A between the minimum power and the low overall power, and also a time T between the instant at which the failure is simulated and at which the overall power drops, and the instant at which the low overall power is reached and stabilized.

With the help of second adjustment means, the method of the invention makes it possible to set these two characteristics, the difference A and the time T. For this purpose, the second adjustment means sends a second signal to the control unit of each engine. On starting the simulation, the control unit adapts the variation in the power from at least one engine accordingly. Thereafter, the overall power from the power plant drops and reaches the low overall power in compliance with the two defined characteristics of difference A and time T.

By modifying these values for the difference A and the time T when simulating the total failure of one engine, it is possible to set the characteristics of the drop in overall power. This drop can thus be adapted to the competence level of the trainee and to the trainee's progress, e.g. by shortening the time T so as to reduce the time it takes for the overall power to stabilize.

Advantageously, by combining the first adjustment means and the second adjustment means, it is possible to simulate various different types of failure in the power plant of the aircraft. Unlike the training mode traditionally present on aircraft and capable of simulating only the total failure of one engine, the method of the invention makes it possible simultaneously to set the low overall power and the difference A and the time T. It thus makes it possible to simulate failures other than a total failure of one engine. The method makes it possible, for example, to simulate the sudden flameout of an engine, the loss of fuel feed to the engine, or indeed the breakage of an internal element of the engine, or the sudden breakage of a power transmission shaft.

The method of the invention also verifies the low overall power value in order to guarantee safe flight of the aircraft and in order to avoid degrading the power plant.

By using verification means, the method of the invention makes it possible to verify that the low overall power value is not less than a first limit power below which safe flight of the aircraft would not be ensured. This first limit power corresponds to a power level making it possible to ensure both that the aircraft has lift and that it is maneuverable. It is a function of the flight conditions and of the weight of the aircraft, and it can be determined by the control unit of each engine. The verification means then compares the low overall power value with this first limit power. If the low overall power value becomes less than this first power limit, then the verification means delivers information to the control unit of each engine so as to ensure that the low overall power is limited to said first limit power, thereby guaranteeing safe flight.

In addition, with the help of the verification means, the method of the invention makes it possible also to verify that the power of each engine used for reaching the low overall power value is not greater than a second power limit above which it is likely that the power plant will be degraded. Depending on the way in which power is shared between the engines, it is possible for the power from a first engine to be reduced to a minimum in order to simulate more accurately the failure of that engine, while the power from a second engine is increased. This second power limit is a function of the flight conditions and of the characteristics of each engine and it is determined by the control unit of each engine. The verification means then compares the power from each engine with the corresponding second limit power. If the power from an engine becomes greater than the corresponding second limit power, then the verification means can deliver information to the control units of the engines in order to share the low overall power differently between the engines.

The method of the invention also makes it possible to display the OEI contingency ratings that correspond to the low overall power value, with the help of display means. The trainee and the instructor both need to know the value of the contingency rating that corresponds to the failure being simulated, in order to avoid exceeding the time limits authorized for the 30-sec OEI and the 2-min OEI contingency ratings. These values are indicated on display means, preferably means identical to the display means used during a real failure, in order to place the trainee in an environment that matches the real environment of a failure.

The present invention also provides a device for simulating a failure in an aircraft having a power plant. The power plant has at least two turbine engines together developing an overall power level. Each engine is capable of delivering at least one contingency power level in order to compensate for a total failure of at least one other engine. Each engine is connected to a respective control unit that serves to control the power of the engine, amongst other things. The control units make it possible in particular for the power plant to develop a low overall power corresponding to the contingency power of this type of failure, or indeed to simulate the failure.

The device of the invention has first adjustment means suitable for controlling each control unit and for setting a low overall power value for the power plant while simulating a failure.

Each control unit serves to control the power from the corresponding engine both in the event of a failure of one of the engines and during a training mode of simulating such a failure. The control units also make it possible to reduce the overall power of the power plant to a first overall power value that is equivalent to the available power for simulating the total failure of one engine.

The first adjustment means of the device is used manually before beginning the simulation to increase or decrease this first value to set a low overall power value. The low overall power can thus be made smaller, e.g. in order to simulate a greater or increased on-board weight in order to adapt to the competence level of the trainee.

In an embodiment of the invention, the first adjustment means has a middle position in which the low overall power value is equal to this first overall power value. The first adjustment means also has intermediate positions between the middle position and both a minimum position and a maximum position. These intermediate positions correspond to first values of the overall power that are respectively decreased or increased between the minimum and maximum low power values.

For example, the maximum low power value may correspond to increasing the low overall power by 10% or to simulating the aircraft having a weight that has been decreased by 10%. Conversely, the minimum low level may correspond to decreasing the low overall power by 10% or to simulating the aircraft weight being increased by 10%.

The device of the invention also has second adjustment means making it possible during the simulation of a failure to set at least one characteristic for the passage of the overall power to the low overall power.

The second adjustment means serves in particular to increase or decrease two particular characteristics, namely the difference A between a minimum power obtained during the drop in the overall power and the low overall power, and also the time T between the instant of the simulated failure at which the overall power drops and the instant at which the low overall power is reached and stabilized.

For this purpose, on starting the simulation of the failure, the control unit of each turbine engine adapts the variation in the power from at least one engine accordingly. Thereafter, the overall power from the power plant drops and reaches the low overall power in compliance with the two defined characteristics of difference A and time T. By way of example, the variation in the power from each engine may be obtained by modifying the feed of fuel to each engine and by varying the deceleration or the acceleration of the speeds of rotation of the engines.

Several variants are possible for the second adjustment means. In a first variant, the second adjustment means has a middle position in which both characteristics, i.e. the difference A and the time T, correspond to the total failure of one engine. The second adjustment means also includes intermediate positions between the middle position and respectively minimum and maximum positions in which each of the two characteristics are respectively decreased or increased between the minimum and maximum values.

In a second variant, the second adjustment means includes a maximum position in which these two characteristics, the difference A and the time T, correspond to the total failure of one engine. The second adjustment means also includes intermediate positions between that maximum position and a minimum position in which these two characteristics are decreased down to respective minimum values.

In a preferred embodiment of the invention, the low overall power is shared uniformly between the engines of the power plant. The engines are therefore at reduced power, thereby limiting any risk of degradation. Furthermore, they can react quickly in the event of a real failure on one of the engines, since a usable power margin is available.

In a second embodiment of the invention, the device includes verification means in order to guarantee safe flight of the aircraft and in order to ensure that the power plant is not degraded.

The verification means serves firstly to verify that the low overall power is not less than a first limit power below which safe flight of the aircraft is not ensured. This first limit power corresponds to a power that makes it possible to ensure both that the aircraft has lift and that it is maneuverable.

The verification means also serves to make it possible to verify that the power delivered by each engine in order to reach the low overall power value does not exceed a second limit power. Above the second limit power, the power plant is likely to be subjected to degradation.

In an embodiment of the invention, the device includes display means for displaying the OEI contingency ratings that correspond to the low overall power, and in particular the 30-sec OEI and the 2-min OEI contingency ratings. The trainee and the instructor need to be informed of those ratings, since their durations of utilization are limited. The values of these 30-sec OEI and 2-min OEI contingency ratings and the value of the OEIcontinuous contingency rating corresponding to the simulated failure are then indicated on display means of the aircraft.

BRIEF DESCRIPTION OF THE SEVERAL VIEWS OF THE DRAWINGS

The invention and its advantages appear in greater detail from the following description of implementations given by way of illustration and with reference to the accompanying figures, in which.

DETAILED DESCRIPTION OF THE INVENTION

Elements that are present in more than one of the figures are given the same references in each of them.

Figure 1:
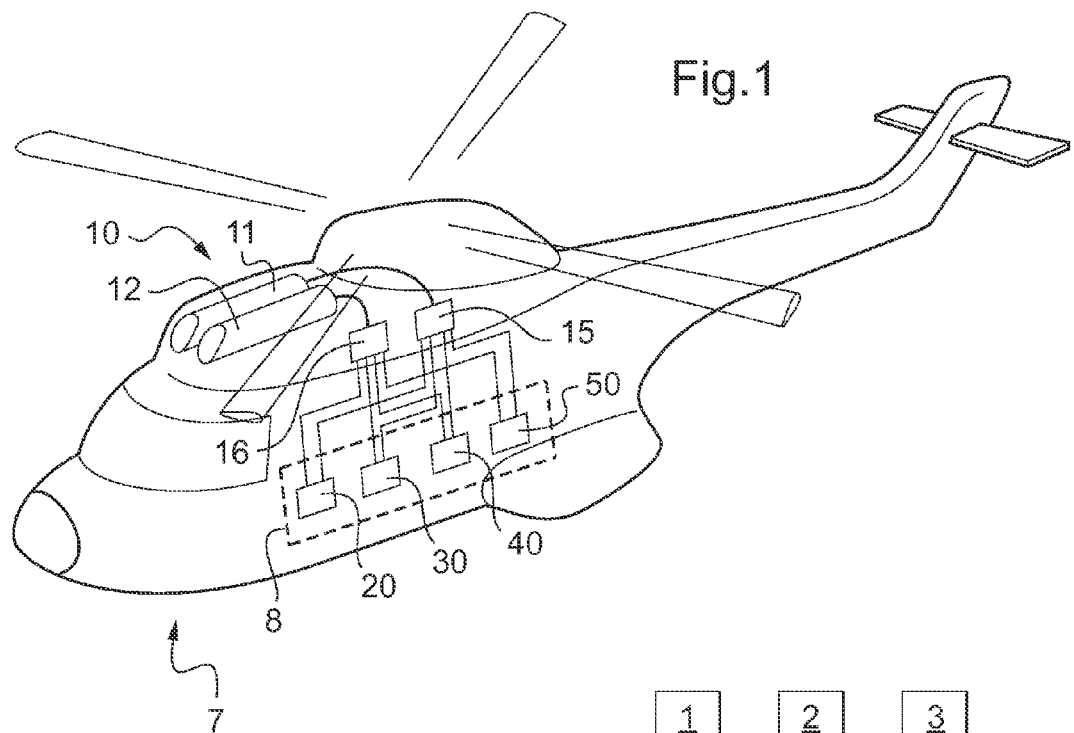
FIG. 1 shows an aircraft fitted with a failure simulator device.

FIG. 1 shows an aircraft 7 having a power plant 10. The power plant 10 comprises two turbine engines 11 and 12 together with two control units 15 and 16, each engine 11 and 12 being connected to a respective control unit 15 or 16. Together the two engines 11 and 12 develop an overall power level. The control units 15 and 16 serve in particular to control the contingency power levels from each engine 11 and 12, in the event of one of the engines 11 and 12 failing completely.

Figure 2:
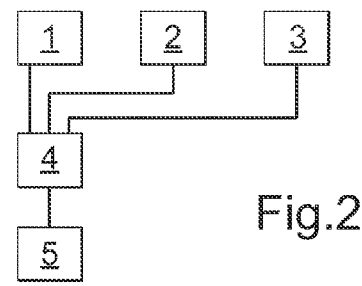
FIG. 2 is a block diagram of the method of the invention.

FIG. 2 is a block diagram of the failure simulation method. Step 1 consists in setting a low value for the overall power from the power plant 10. Step 4 then consists in lowering the overall power from the power plant 10 down to this low value. This step 4 corresponds to the beginning of simulating a failure.

Step 2 consists in setting the characteristics for the passage of the overall power to the low value as set in step 1. Step 2 takes place simultaneously with step 1.

Step 3 consists in verifying that the value for the overall power, as set in step 1, guarantees safe flight for the aircraft 7 and does not degrade the power plant. Step 3 takes place simultaneously with step 1.

Step 5 consists in displaying the contingency ratings 30-sec OEI, 2-min OEI, and OEIcontinuous that correspond to the selected low overall power from the power plant. Step 5 takes place after step 4.

The aircraft 7 may also include a failure simulator device 8. The device 8 is provided with first adjustment means 20, second adjustment means 30, display means 40, and verification means 50.

The first adjustment means 20 serves to set the low overall power value for the power plant 10. The second adjustment means 30 serves to set the characteristics of the passage of the overall power to the low level, as set by the first adjustment means 20.

The verification means 50 serves to verify that the low value of the overall power as set in step 1 guarantees safe flight for the aircraft 7 and also guarantees no degradation of the power plant.

The display means 40 serves to display the value of the contingency ratings 30-sec OEI, 2-min OEO, and OEIcontinuous corresponding to the low overall power of the power plant 10.

The low value for the overall power is set during step 1 by using the first adjustment means 20 serving to increase or decrease a first overall power value of the power plant 10 to the low value. This first overall power value is equivalent to the overall power that is available in the event of a total failure of one of the engines 11 and 12.

Thereafter, the first adjustment means 20 delivers a first signal to the control units 15 and 16, which signal corresponds to the low value. During step 4, the control units 15 and 16 control the power of the engines 11 and 12 so that the overall power of the power plant 10 is equal to the low value set in step 1.

This low overall power delivered by the power plant 10 is obtained by sharing power uniformly between the two engines 11 and 12.

Figure 3:
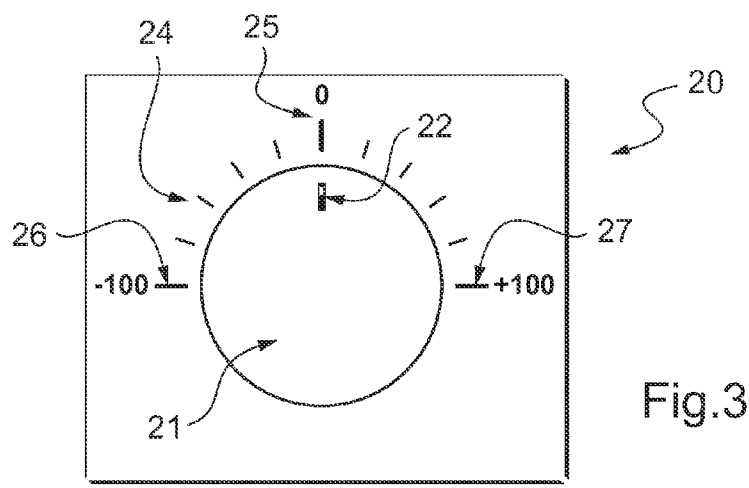
FIG. 3 shows an embodiment of the first adjustment means of the device.

The first adjustment means 20, shown in FIG. 3, comprises a rotary knob 21 having a mark 22 and graduations 24. When the knob 21 is turned, the mark 22 moves between a minimum graduation 26 and a maximum graduation 27, with a middle graduation 25 being present between the minimum graduation 26 and the maximum graduation 27.

When the mark 22 is in alignment with the middle graduation 25, e.g. labeled "0", the low value is equal to the first overall power value of the power plant 10. When the mark 22 is in alignment with a graduation line between the middle graduation 25 and the maximum graduation 27, e.g. labeled "+100", or when it is aligned with the maximum graduation 27, the low value is increased. Conversely, when the mark 22 is aligned with a graduation between the middle graduation 25 and the minimum graduation 26, e.g. labeled "−100", or indeed is in alignment with the minimum graduation 26, then the low value is decreased.

During step 3, the second adjustment means 30 serves to increase or decrease two particular characteristics for the passage of the overall power to the low overall power. These are the difference A between a minimum power that appears while simulating the failure, and the low overall power, and also the time T between the instant during the simulated failure at which the overall power drops, and the instant at which the low overall power is reached and stabilized.

Figure 5:
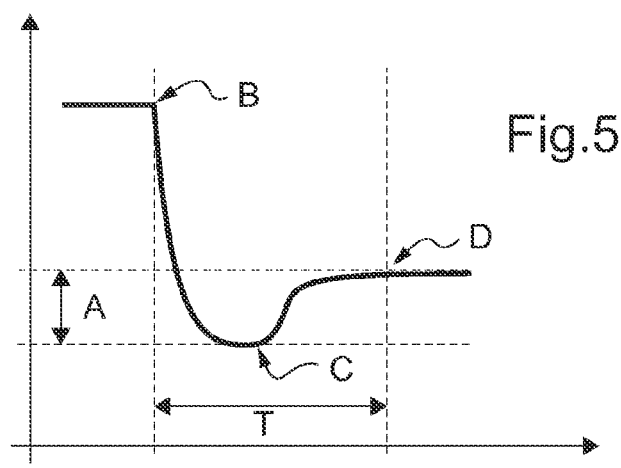
FIG. 5 plots a curve representing the overall power delivered by the power plant.

FIG. 5 is a curve plotting variation in the overall power from the power plant 10 up the ordinate, as a function of time along the abscissa, with these characteristics A and T being identified thereon. In the event of a total failure of one engine at point B, the overall power drops rapidly to the minimum power at point C. Thereafter, the overall power increases until it stabilizes at point D at the low overall power. The difference A is the power difference between the minimum power and the stabilized low overall power, i.e. between the points C and D. The time T is the time difference between the instant at which the overall power drops and the instant at which the low overall power is stabilized, i.e. between the points B and D.

The second adjustment means 30 then transmits a second signal to the control units 15 and 16, the second signal corresponding to these characteristics. Thereafter, during the step 4, variation in the power from at least one engine is then adapted so that the overall power from the power plant drops and reaches the low overall power in compliance with the two defined characteristics of difference A and time T.

The variation in the power from each engine 11 and 12 under the control of the control units 15 and 16 may be obtained, for example, by modifying the feed of fuel to each engine 11 and 12 and also by varying the deceleration or the acceleration of the speeds of rotation of at least one of the engines 11 and 12.

Figure 4:
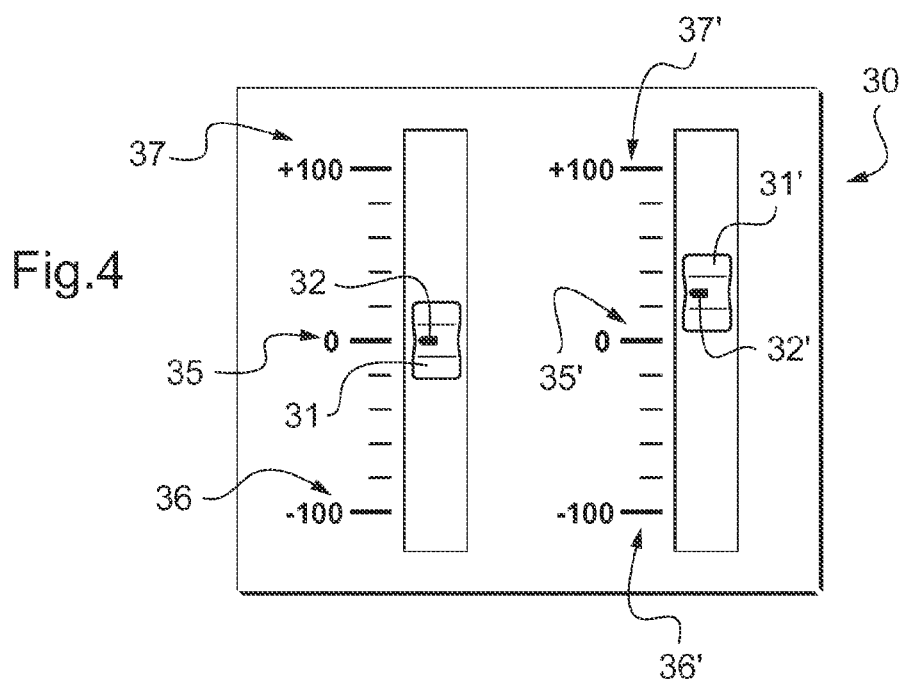
FIG. 4 shows an embodiment of the second adjustment means of the device.

The second adjustment means 30, shown in FIG. 4, has two buttons 31 and 31', each button 31 and 31' being movable in linear manner between a minimum graduation 36 or 36' and a maximum graduation 37 or 37'. A middle graduation 35 or 35' is present between the minimum graduation 36 or 36' and the maximum graduation 37 or 37'. The buttons 31 and 31' carry respective marks 32 and 32', serving respectively to modify the difference A and the time T.

When the marks 32 and 32' are simultaneously in alignment with the middle graduations 35 and 35', e.g. labeled "0" and present between the corresponding minimum and maximum graduations & 37 and 36' & 37', the simulation device does not apply any modification to the variation in the overall power from the power plant 10 during the step 4. This variation in the overall power thus corresponds to a complete failure of one of the two engines 11 and 12.

When the mark 32 of the button 31 is in alignment with a graduation between the middle graduation 35 and the maximum graduation 37, e.g. labeled "+100", or indeed is in alignment with the maximum graduation 37, then the difference A in the variation of the total power from the power plant 10 is increased. Conversely, when the mark 32 is in alignment with a graduation between the middle graduation 35 and the minimum graduation 36, e.g. labeled "−100", or indeed when it is in alignment with the minimum graduation 36, then the difference A is decreased.

In similar manner, moving the button 31' between the minimum and maximum graduations 36' and 37' serves to increase or decrease the time T of the variation in the overall power from the power plant 10.

By combining the first adjustment means 20 and the second adjustment means 30, various different types of failure can be simulated by the power plant 10, such as total failure of one engine 11 or 12, one of the engines 11 or 12 suddenly flaming out, or an internal element of the engine 11 or 12 breaking, and also sudden breakage of a power transmission shaft.

Furthermore, during step 3, the verification means 50 verifies that the low value of the total power as set in step 1 is not less than a first limit power below which safe flight of the aircraft 7 is not ensured. The verification means 50 also verifies that the power from each engine making it possible to reach the low value for the overall power is not greater than a second power limit, above which degradation is likely to occur in the power plant.

During step 5, the display means 40 serves to display the contingency rating 30-sec OEI, 2-min OEI, and OEIcontinuous, as the case may be.

Figure 6:
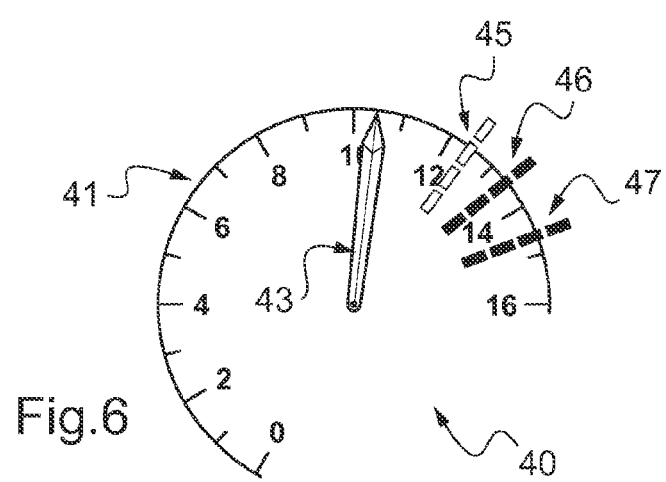
FIG. 6 shows an embodiment of the display means of the device.

The display means 40, as shown in FIG. 6, comprises a dial 41 having graduations and a moving pointer 43. These graduations represent the power levels of the power plant 10 of the aircraft 7, and the pointer 43 indicates the instantaneous power from the power plant 10. The pilot can thus visualize the power margin that is available. In particular, while simulating a failure, the powers corresponding to the various OEI contingency ratings are displayed. The trainee must know the values of these contingency ratings corresponding to the low overall power of the simulated failure, in particular in order to avoid exceeding the authorized time limits. The display means 40 thus indicate the contingency ratings 30-sec OEI, 2-min OEI, and OEIcontinuous respectively by using marks 47, 46, and 45.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. A method of simulating a failure for an aircraft having a power plant, the power plant having at least two turbine engines together developing an overall power, each engine being capable of delivering at least one contingency power level in order to compensate for a failure of at least one other engine, wherein a low value, selected from any of a plurality of values lying between a minimum value and a maximum value, for the overall power is set manually with the help of first adjustment means and the overall power is reduced to the low value in order to simulate the failure and display means is used to display at least one OEI (one engine inoperative) contingency rating corresponding to the low value of the overall power.

2. The method according to claim 1, wherein at least one characteristic for the passage of the overall power to the low value is set with the help of second adjustment means prior to lowering the overall power.

3. The method according to claim 2, wherein the low value for the overall power is reached, the overall power dropping down to a minimum power before increasing and stabilizing at the low value for the overall power, and the characteristics comprise a difference A between the minimum power and the low value for the overall power, and also a time T between the instant at which the failure is simulated and the instant at which the overall power stabilizes at the low level.

4. The method according to claim 1, wherein verification means is used to verify that the low value for the overall power is not less than a first limit power below which safe flight for the aircraft is not assured.

5. The method according to claim 4, wherein the verification means is used to verify that each power level from the engines constituting the low value for the overall power is not greater than a second limit power above which the power plant is liable to be degraded.

6. The method according to claim 1, wherein the low value for the overall power is shared uniformly among all of the engines.

7. A failure simulator device for an aircraft, comprising:
a power plant having at least two turbine engines together developing an overall power, each engine being capable of delivering at least one contingency power in order to compensate for a failure of at least one other engine; and
one control unit for each engine, each control unit being connected to the corresponding engine and controlling its power;
wherein the device comprises first adjustment means suitable for controlling the control units and for setting a low value, selected from any one of a plurality of values lying between a minimum value and a maximum value, of the overall power when simulating the failure;
wherein the device further comprises display means to display at least one OEI (one engine inoperative) contingency rating corresponding to the low value of the overall power.

8. The device according to claim 7, wherein the device comprises second adjustment means suitable for controlling the control units and for setting at least one characteristic for the passage of the overall power to the low value for the overall power.

9. The device according to claim 8, wherein the low value for the overall power is reached, the overall power dropping down to a minimum power before increasing and stabilizing at the low value for the overall power, and the characteristics comprise a difference A between the minimum power and the low value for the overall power, and a time T between the instant of the simulated failure and the instant at which the overall power stabilizes at the low value.

10. The device according to claim 8, wherein the control unit can modify the feeding of fuel to the engine to which it is connected in order to modify at least one of the characteristics.

11. The device according to claim 7, wherein the device includes verification means for verifying that the low value of the overall power is not less than a first limit power below which safe flight of the aircraft is not ensured.

12. The device according to claim 11, wherein the verification means serves to verify that each power level from the engines constituting the low value for the overall power is not greater than a second limit power above which the power plant is liable to be degraded.

13. The device according to claim 7, wherein the low value for the overall power is shared uniformly among all the engines.

14. A method of simulating a failure for an aircraft having a power plant, the power plant having at least two turbine engines together developing an overall power, each engine being capable of delivering at least one contingency power level in order to compensate for a failure of at least one other engine, wherein a low value, selected from any of a plurality of values lying between a minimum value and a maximum value, for the overall power is set manually with the help of first adjustment means and the overall power is reduced to the low value in order to simulate the failure;
wherein at least one characteristic for the passage of the overall power to the low value is set with the help of second adjustment means prior to lowering the overall power;
wherein the low value for the overall power is reached, the overall power dropping down to a minimum power before increasing and stabilizing at the low value for the overall power, and the characteristics include a difference A between the minimum power and the low value for the overall power and a time T between the instant at which the failure is simulated and the instant at which the overall power stabilizes at the low level.

15. The method according to claim 14, wherein verification means is used to verify that the low value for the overall power is not less than a first limit power below which safe flight for the aircraft is not assured.

16. The method according to claim 15, wherein the verification means is used to verify that each power level from the engines constituting the low value for the overall power is not greater than a second limit power above which the power plant is liable to be degraded.

17. The method according to claim 14, wherein the low value for the overall power is shared uniformly among all of the engines.

18. The method according to claim 14, wherein display means is used to display at least one OEI (one engine inoperative) contingency rating corresponding to the low value of the overall power.

19. A failure simulator device for an aircraft, comprising:
a power plant having at least two turbine engines together developing an overall power, each engine being capable of delivering at least one contingency power in order to compensate for a failure of at least one other engine; and
one control unit for each engine, each control unit being connected to the corresponding engine and controlling its power;
wherein the device includes first adjustment means suitable for controlling the control units and for setting a low value, selected from any one of a plurality of values lying between a minimum value and a maximum value, of the overall power when simulating the failure;

wherein the device further includes second adjustment means suitable for controlling the control units and for setting at least one characteristic for the passage of the overall power to the low value for the overall power;

wherein the low value for the overall power is reached, the overall power dropping down to a minimum power before increasing and stabilizing at the low value for the overall power, and the characteristics include a difference A between the minimum power and the low value for the overall power and a time T between the instant of the simulated failure and the instant at which the overall power stabilizes at the low value.

\* \* \* \* \*